United States Patent
Main et al.

(10) Patent No.: US 8,060,416 B2
(45) Date of Patent: Nov. 15, 2011

(54) METHOD AND SYSTEM FOR PROVIDING ADVERTISING INVENTORY INFORMATION IN RESPONSE TO DEMOGRAPHIC INQUIRIES

(75) Inventors: Robert Allen Main, San Francisco, CA (US); Dz-Mou Jung, San Jose, CA (US); Wendy Krehbiel, Milpitas, CA (US); David Leger, Campbell, CA (US)

(73) Assignee: Yahoo! Inc., Santa Clara, CA (US)

( * ) Notice: Subject to any disclaimer, the term of this patent is extended or adjusted under 35 U.S.C. 154(b) by 2581 days.

(21) Appl. No.: 09/850,949

(22) Filed: May 7, 2001

(65) Prior Publication Data

US 2004/0138956 A1   Jul. 15, 2004

Related U.S. Application Data

(60) Provisional application No. 60/219,036, filed on Jul. 18, 2000.

(51) Int. Cl.
*G06Q 10/00* (2006.01)
*G06F 17/60* (2006.01)

(52) U.S. Cl. ........................................... 705/28; 705/14

(58) Field of Classification Search ................ 705/7, 8, 705/10, 26, 27, 28, 29, 37; 707/1, 3, 6, 10, 707/100, 104.1
See application file for complete search history.

(56) References Cited

U.S. PATENT DOCUMENTS

| | | | |
|---|---|---|---|
| 5,715,402 A | 2/1998 | Popolo | |
| 5,797,127 A | 8/1998 | Walker et al. | |
| 5,974,396 A | 10/1999 | Anderson et al. | |
| 6,112,181 A | 8/2000 | Shear et al. | |
| 6,144,944 A | 11/2000 | Kurtzman, II et al. | |
| 6,212,554 B1 * | 4/2001 | Roskowski | 709/217 |
| 6,216,129 B1 | 4/2001 | Eldering | |
| 6,285,987 B1 * | 9/2001 | Roth et al. | 705/14.71 |
| 6,298,348 B1 | 10/2001 | Eldering | |
| 6,324,519 B1 * | 11/2001 | Eldering | 705/14 |
| 6,408,278 B1 | 6/2002 | Carney et al. | |
| 6,421,662 B1 * | 7/2002 | Karten | 1/1 |
| 6,446,045 B1 | 9/2002 | Stone et al. | |
| 6,701,355 B1 * | 3/2004 | Brandt et al. | 709/219 |
| 6,904,408 B1 * | 6/2005 | McCarthy et al. | 705/2 |
| 6,985,882 B1 * | 1/2006 | Del Sesto | 705/37 |
| 7,089,195 B2 * | 8/2006 | Rosenberg | 705/14.69 |
| 2001/0010046 A1 * | 7/2001 | Muyres et al. | 705/52 |
| 2001/0039510 A1 * | 11/2001 | Galomb | 705/14 |

* cited by examiner

*Primary Examiner* — Garcia Ade
(74) *Attorney, Agent, or Firm* — Brinks Hofer Gilson & Lione

(57) ABSTRACT

The present invention relates to a method and system for providing advertising inventory information. More specifically, the present invention relates to a method and system for providing advertising inventory information in response to demographic inquiries. In an exemplary embodiment, a server responds to a demographic query. Based on the query, the server queries an advertising inventory database and a contract database to retrieve relevant information. Using the relevant information, the total inventory and the total sold inventory are obtained. Using the now obtained total inventory and the total sold inventory information, the server then provides an estimation of the total available inventory matching the query.

12 Claims, 4 Drawing Sheets

METHOD AND SYSTEM FOR PROVIDING ADVERTISING INVENTORY INFORMATION IN RESPONSE TO DEMOGRAPHIC INQUIRIES

CROSS-REFERENCES TO RELATED APPLICATION(S)

This application claims the benefit of priority under 35 U.S.C. §119 from U.S. Provisional Patent Application Ser. No. 60/219,036 filed on Jul. 18, 2000, the disclosure of which is hereby incorporated by reference in its entirety for all purposes.

BACKGROUND OF THE INVENTION

Use of the Internet by the general public is certainly gaining popularity. More and more people are getting access to the Internet and the vast amount of information that it provides. Due to the rapid increase in the number of Internet users, advertising on the Internet has consequently become an important priority for many advertisers.

As a result, for web portals and ISPs, a significant amount of revenue can be generated from displaying advertisers' ad banners on displayed websites or web pages. For example, for a preeminent portal such as Yahoo! which is visited daily by millions of users, considerable revenue can be made by displaying an advertiser's ads on its websites or web pages.

Generally, the advertisers pay a fee for each ad viewed by web users. Contracts to show ads are normally signed several weeks/months before the ads get delivered. The duration of contracts ranges from one day to multiple years. Typically, there are several types of contracts, including regular contracts, exclusive contracts and infinite contracts. For regular contracts, the advertisers purchase a designated number of ad views on a chosen space (web page). For exclusive contracts, they purchase all the ad views on a chosen space. For infinite contracts, they purchase all the leftover ad views on a chosen space after other regular contracts related to that space have been fulfilled.

Like advertising conducted through more traditional medium, such as TV or printed publications, advertising on the Internet is similarly subject to physical limitation. For obvious reasons, it is a natural and often most selected choice for advertisers to request ad views on the more popular web pages. However, since there is a finite amount of physical space on a web page, demand for ad space or ad views on popular web pages often exceeds supply. Thus, information on the level of available inventory is needed so advertisers can be advised appropriately to avoid overbooking of web pages.

In addition, while new contracts for ad views go into effect everyday, old contracts expire at the same time. The volume of newly subscribed ad views does not necessarily match that of expiring ad views. Hence, the level of available inventory varies depending on the pending and expiring contracts. In that regard, ascertaining the level of available inventory is also important. For example, ideally, the level of available inventory should be kept as low as possible so as to maximize advertising revenue. Therefore, it would be desirable to provide a method and system which is capable of ascertaining the level of available inventory on a system-wide basis.

Moreover, the placement of ads is often, to a large extent, affected by demographics. Consequently, contracts to show ads often specify the target demographic group. Thus, before a contract is executed, it would be helpful to know the quantity of available inventory for the specified target demographic group. Therefore, it would be desirable to provide a method and system which is capable of providing advertising inventory information in response to demographic inquiries.

Furthermore, representing all the information in an advertising inventory database is a non-trivial task. This is due to the need to order the large number of combinations of demographic values over time. It is empirically determined that approximately $10^{35}$ combinations of demographic attributes need to be represented. This high number of combinations is infeasible to implement in a database. Therefore, it would also be desirable to provide a method and system which is capable of effectively storing inventory information in a database.

SUMMARY OF THE INVENTION

The present invention relates to a method and system for providing advertising inventory information. More specifically, the present invention relates to a method and system for providing advertising inventory information in response to demographic inquiries.

In an exemplary embodiment, a server responds to a demographic query. Based on the query, the server queries an advertising inventory database and a contract database to retrieve relevant information. Using the relevant information, the total inventory and the total sold inventory are obtained. Using the now obtained total inventory and the total sold inventory information, the server then provides an estimation of the total available inventory matching the query.

Accordingly, in one embodiment, a computerized system for providing inventory information in response to a query having demographic criteria is provided, the system comprising: a module configured to determine total query inventory which satisfies the demographic criteria of the query; a module configured to determine total contract inventory which satisfies criteria of a contract; a module configured to determine intersection between the total query inventory and the total contract inventory; a module configured to determine contract delivery target pursuant to the contract; a module configured to determine total sold inventory using the intersection and the contract delivery target; and a module configured to determine total available inventory using the total query inventory and the total sold inventory. Optionally, all the modules are implemented using computer software.

Accordingly, in another embodiment, a method for providing inventory information in response to a query having demographic criteria is provided, the method comprising: determining total query inventory which satisfies the demographic criteria of the query; determining total contract inventory which satisfies criteria of a contract; determining intersection between the total query inventory and the total contract inventory; determining contract delivery target pursuant to the contract; determining total sold inventory using the intersection, the contract delivery target and the total contract inventory; and determining total available inventory using the total query inventory and the total sold inventory.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DESCRIPTION OF THE SPECIFIC EMBODIMENTS

Figure 1:
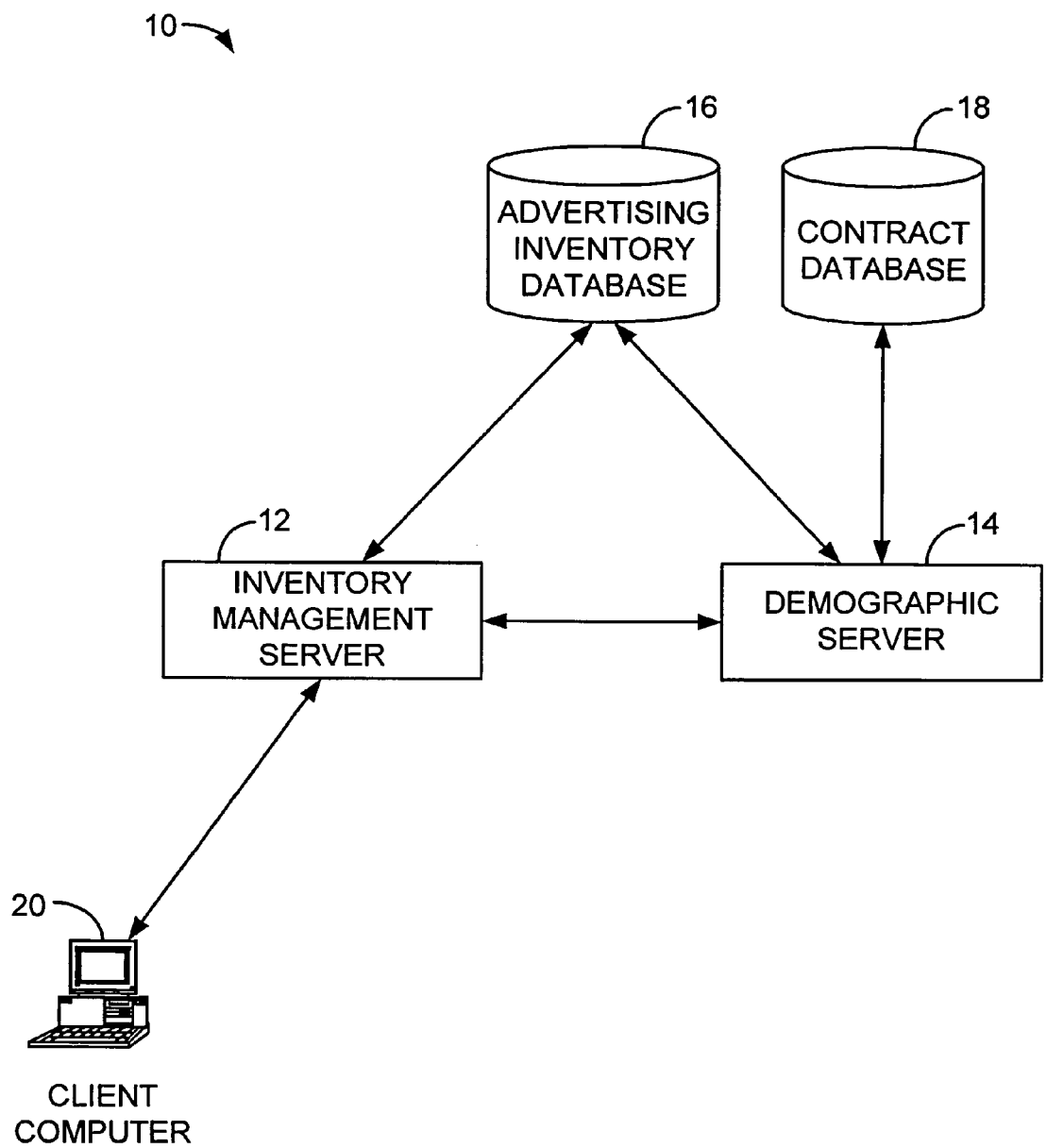
FIG. 1 is a simplified schematic diagram showing an exemplary computer system which can be used to practice the present invention.

Various embodiments of the present invention will now be described. FIG. 1 is a simplified schematic diagram showing an exemplary computer system 10 which can be used to practice the present invention. The computer system 10 includes an inventory management server 12, a demographic server 14, an advertising inventory database 16, a contract database 18 and a client computer 20.

The inventory management server 12 manages the advertising inventory which resides on the advertising inventory database 16. The inventory management server 12 also interacts with the demographic server 14 and the client computer 18. The demographic server 14 provides inventory availability information in response to demographic inquiries.

Salespeople who are interested in obtaining information on specific ads, such as availability of ads for a targeted demographic group, enter their requests via the client computer 20. The client computer 20 relays the requests to the inventory management server 12. The inventory management server 12, in turn, formats or translates the requests into queries and then forwards such queries to the demographic server 14 for processing. The demographic server 14 then queries the advertising inventory database 16 and the contract database 18 to obtain the requisite inventory and contract information so as to allow it to calculate the desired inventory availability information.

In an exemplary embodiment in accordance with the present invention, the demographic server 14 responds to demographic queries. A demographic query is a request for availability of advertising inventory having selected demographics. The query includes a date range and a set of demographic attributes or criteria. Based on the query, the demographic server 14 queries the advertising inventory database 16 and retrieves relevant information which corresponds to the query including, for example, the total inventory which satisfies the criteria specified in the query.

The demographic server 14 also queries the contract database 18 to retrieve the requisite contract or sales information. The contract information is needed to so as to allow the demographic server 14 to calculate the total sold inventory which satisfies the criteria specified in the query.

Using the total inventory and the total sold inventory information, the demographic server 14 then provides an estimation of the total available inventory matching the query. The total available inventory is not represented explicitly in the advertising inventory database 16 because the size of the data is too large to be represented explicitly over time. Based on heuristic calculations, there are too many possible permutations and aggregations of the demographic attributes (more than $10^{35}$)

In a preferred embodiment, the demographic server 14 is an independent UNIX operating system which responds to structured, encoded requests for demographic inventory counts on a socket in serial.

In an exemplary embodiment, given a query with a date range and respective values for the demographic attributes, the demographic server 14 estimates the total available inventory which satisfies the criteria specified in the query as follows.

Figure 2:
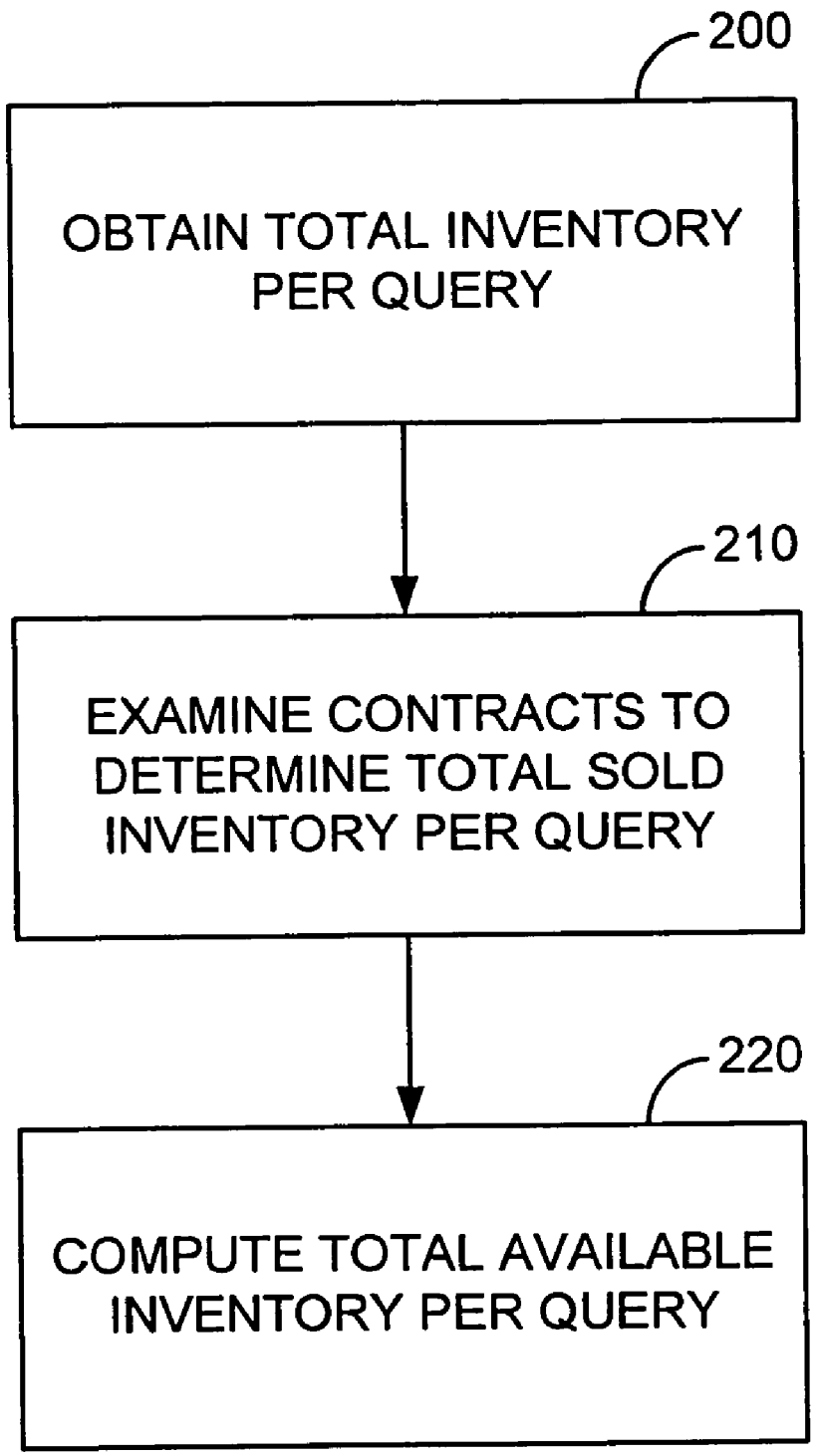
FIG. 2 is a simplified flow diagram illustrating one embodiment of the process used to calculate the total available inventory which corresponds to a query in accordance with the present invention.

FIG. 2 is a simplified flow diagram illustrating one embodiment of the process used by the demographic server 14 to calculate the total available inventory which corresponds to a query. First, at 200, the total inventory which fits the criteria specified in the query is obtained. The demographic server 14 obtains the total inventory information from the advertising inventory database 16. Depending on the design and/or constraints of the advertising inventory database 16, many commonly known techniques and methods can be used to obtain or calculate the total inventory. A person of ordinary skill in the art should be familiar with these techniques and methods.

At 210, once the total inventory which corresponds to the query is obtained, all the ad contracts are examined to determine how much of the total inventory has been sold pursuant to the contracts. The examination of the contracts is conducted in an unordered manner, i.e., the contracts are not pre-arranged in any specific order for examination. The demographic server 14 performs this determination by obtaining the relevant contract information from the contract database 18. The process of determining the total sold inventory will be described in further details below.

At 220, the total sold inventory is then subtracted from the total inventory to obtain the total available inventory.

Figure 3:
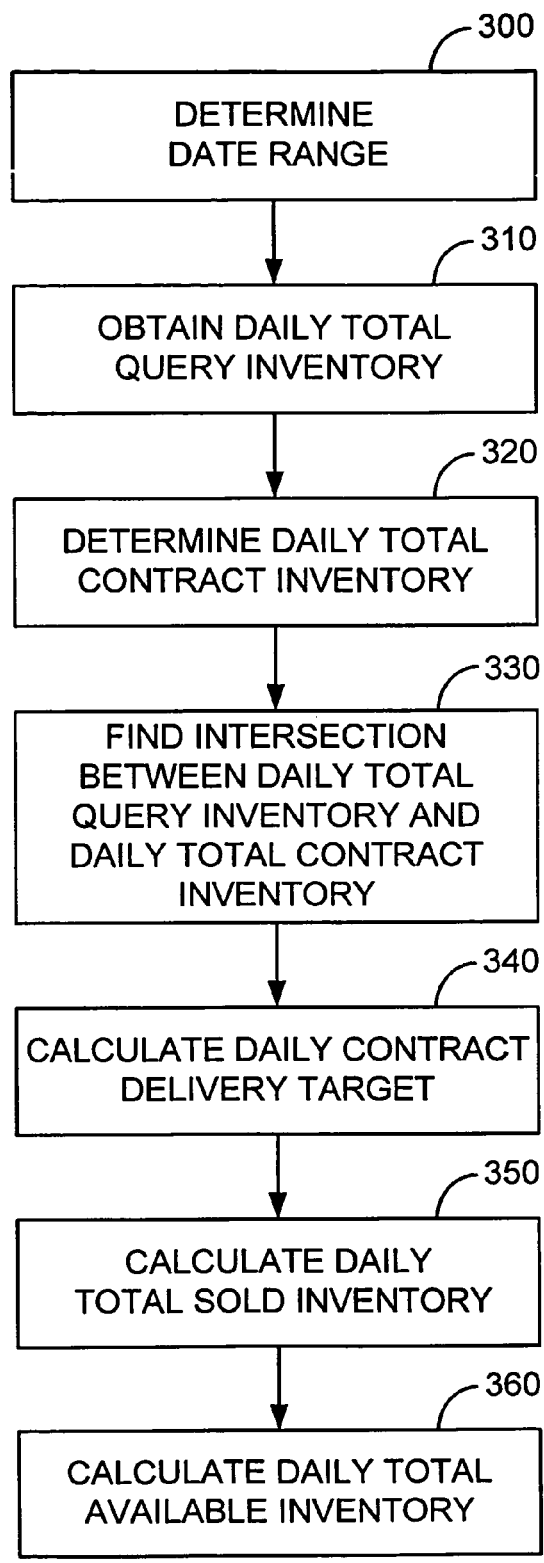
FIG. 3 is a simplified flow diagram illustrating another embodiment of the process used to calculate the total available inventory which corresponds to a query in accordance with the present invention.

FIG. 3 is a simplified flow diagram illustrating another embodiment of the process used by the demographic server 14 to calculate the total available inventory which corresponds to a query. FIG. 3 illustrates the exemplary process shown in FIG. 2 in further details.

Referring to FIG. 3, at 300, information is extracted from a query to determine the date range. As will be explained below, calculations are performed for each day within the specified date range to provide daily total available inventory information.

At 310, once the date range is determined, for each day within the date range, the amount of daily total inventory which satisfies the criteria specified in the query is obtained. For purposes herein, the daily total inventory which satisfies the criteria specified in the query is referred to as the daily total query inventory.

Each contract is examined to determine whether it has an impact on the total inventory which corresponds to the query. That is, each contract is examined to determine how much of the total inventory which corresponds to the query has been sold pursuant to that contract.

More specifically, for each day of the contract that falls within the specified date range, the following calculations are performed. First, at 320, the amount of daily total inventory which satisfies the criteria specified in the contract is determined. For purposes herein, the daily total inventory which satisfies the criteria specified in the contract is referred to as the daily total contract inventory.

Next, at 330, the intersection between the daily total contract inventory and the daily total query inventory is computed. For purposes herein, this intersection is referred to as the contract/query intersection. The contract/query intersection represents how much of the daily total contract inventory and the daily total query inventory overlap.

Then, at 340, the daily contract delivery target for that day is calculated. Generally, the daily contract delivery target is calculated by dividing the total contract delivery target by the contract duration (measured in days). It should be noted that the daily contract delivery target may be obtained in some other manner. For example, the daily contract delivery target may be explicitly specified in the contract.

At this point, the following three quantities are known: the daily contract delivery target, the contract/query intersection, and the amount of daily total contract inventory. At 350, the amount of daily total sold inventory which satisfies the criteria specified in the contract is calculated by multiplying the daily contract delivery target and the contract/query intersection together and then dividing the product by the amount of daily total contract inventory.

At 360, the amount of daily total sold inventory is then subtracted from the amount of daily total query inventory to arrive at the amount of daily total available inventory.

The amount of daily total sold inventory for each day of the contract is determined and the amount of daily total available inventory for each day of the date range specified in the query is accordingly calculated. The foregoing calculations are repeated for each day of the contract. As a result, for each contract, the daily impact of the contract on each day's daily total query inventory is determined. In other words, how much of the daily total query inventory has been sold pursuant to that contract is determined. The respective amounts of daily total available inventory for all the days within the date range specified in the query and other quantities are accumulated.

The foregoing process is repeated for each contract. After all the contracts have been examined, the respective amounts of daily total available inventory for all the days within the specified date range can be added up to obtain the total available inventory which satisfies the criteria specified in the query. As a result, the collective impact of all the contracts on the total inventory which satisfies the criteria specified in the query can be determined. The foregoing process is illustrated using the pseudo code shown in Table 1 below.

TABLE 1

For each day of query
    Avail[day] = db(query's demographics);
    For each contract n
    For each day of contract n
        Avail[day] −=db(contract n && query)/db(contract n) ×
            contract n delivery target/contract n duration
TotalAvail = sum(Avail[each day])

The foregoing process gives a reliable, distributed estimation, which closely models the effective ad delivery behavior. It should be noted that the foregoing process does not rely on ordering of the contracts, which is required for doing absolute inventory optimization (inventory shifting). Therefore, by using the foregoing process the computational complexity is reduced from $O(n*n)$ to $O(n)$ where n is the number of contracts.

The following is an illustrative example illustrating how the demographic server 14 determines the amount of total available inventory for a query. Assume a query containing the following information: [January 1-June 30, male Seattle @ finance], i.e., the query contains a date range of January 1 to December 31 and a set of demographic attributes including males, Seattle and finance. In other words, the demographic server 14 is asked to determine how much advertising inventory is available on the finance property from January 1 to June 30 which is targeted toward males living in Seattle. In this context, the "finance property" represents an entity in which ads are available for sale. For example, the "finance property" may be a series of web pages which are related to various topics in finance.

Calculations are performed for each day of the specified date range. However, for illustrative purposes, it is sufficient to perform calculations only for one day in this particular example. Based on the disclosure and teachings provided herein, a person of ordinary skill in the art should be able to implement the process in accordance with the present invention.

First, the demographic server 14 queries the advertising inventory database 16 to retrieve information on the daily total inventory which satisfies the query on January 1. Assume, for example, that the daily total query inventory on January 1 in this case is 100M.

The demographic server 14 then queries the contract database 18 in order to examine all the contracts. The examination of these contracts is conducted in an unordered manner, i.e., the contracts do not have to be pre-arranged in any specified order. Each of the contracts is examined on an individual basis. Assume, for example, a contract having the following information: [January 1-January 31, sports @ finance, 31M], i.e., the contract is taken out for 31M ads on the finance property with a target audience of people interested in sports and the ads are scheduled to be delivered over a 31-day period. Since this contract has a duration within the specified date range of the query, this contract will be evaluated. Otherwise, for example, if this contract had a duration from July 1 to July 31, then it would have been passed over as having no effect on the total inventory which satisfies the query.

Having obtained the relevant information from the contract, the demographic server 14 then queries the advertising inventory database 16 to determine the daily total inventory on January 1 which satisfies the criteria specified by the contract. Assume, in this case, that the daily total contract inventory on January 1 for ads on the finance property which are targeted toward people interested in sports is 50M.

Next, the contract/query intersection is calculated. As noted above, the contract/query intersection is the intersection between the daily total contract inventory and the daily total query inventory. Using the example given above, the contract/query intersection represents the total inventory on January 1 for ads on the finance property which are targeted toward males living in Seattle who are also interested in sports. Assume, in this case, the contract/query intersection is 10M.

The daily contract delivery target is then calculated. The daily contract delivery target is the total contract delivery target divided by the contract duration (measured in days) which, in this case, is 31M/31 days=1M/day.

The daily total sold inventory on January 1 which satisfies the criteria specified by the query is then calculated. More specifically, the daily total sold inventory is calculated by multiplying the daily contract delivery target and the ratio between the contract/query intersection and the daily total contract inventory. In this example, the daily total sold inventory is then: 1M×10M/50M=0.2M.

Once the daily total sold inventory is calculated, the daily total available inventory for that day is then determined by subtracting the daily total sold inventory from the daily total query inventory. In this example, the daily total available inventory on January 1 is then: 100M−0.2M=99.8M.

As noted above, although not shown here, it is understood that the daily total available inventory is calculated and accumulated for each day of the contract which falls into the specified date range of the query. The foregoing calculations are also performed for each contract, if necessary. Since it is unlikely that all contracts will affect the total available inventory which satisfies the criteria specified by the query, some contracts will be eliminated in calculating the total available inventory.

For example, using the same query as given above, a contract having the following information: [January 1-January 31, female @ finance, 31M] will have no effect on the total available inventory which corresponds to the query. This is because the attributes "male" and "female" are mutually exclusive. Therefore, the contract/query intersection is null or zero, which means that the total sold inventory which is attributed to the contract is also null or zero.

The present invention as described herein can be implemented using both hardware and/or software, or a combination thereof. The present invention can be implemented in a modular or integral manner. Furthermore, the present invention can be implemented using computer language such as C, C++, etc. In addition, while it is shown that an embodiment of the present invention is implemented on a single server, it is to be understood that the present invention can also be implemented using one or more servers. A person of ordinary skill in the art will know of other ways, methods and techniques to implement the present invention.

As mentioned above, the advertising inventory database 16 contains inventory information. The inventory information is stored and organized based on demographic attributes. Information which is to be stored into the advertising inventory database 16 typically comes from another source such as an adlog file. Information from the adlog file is processed before it is stored onto the advertising inventory database 16. The adlog file is a record of all the ads shown to users and is typically organized in a line-by-line manner. Each adlog entry includes demographic and other inventory information concerning a particular ad. As will be explained further below, the demographic information from each line of the adlog file is used to form an index to the advertising inventory database 16.

In an exemplary embodiment, the advertising inventory database 16 is organized in the following manner. Information is stored in separate buckets. These buckets are indexed by an index table. Demographic information from each adlog entry is used by a hash function to generate a bucket index. A bucket index represents a position in the index table where pointer information can be found to locate an indexed bucket. The information from the adlog entry is then stored as an individual entry in the bucket indexed by that bucket index.

Figure 4:
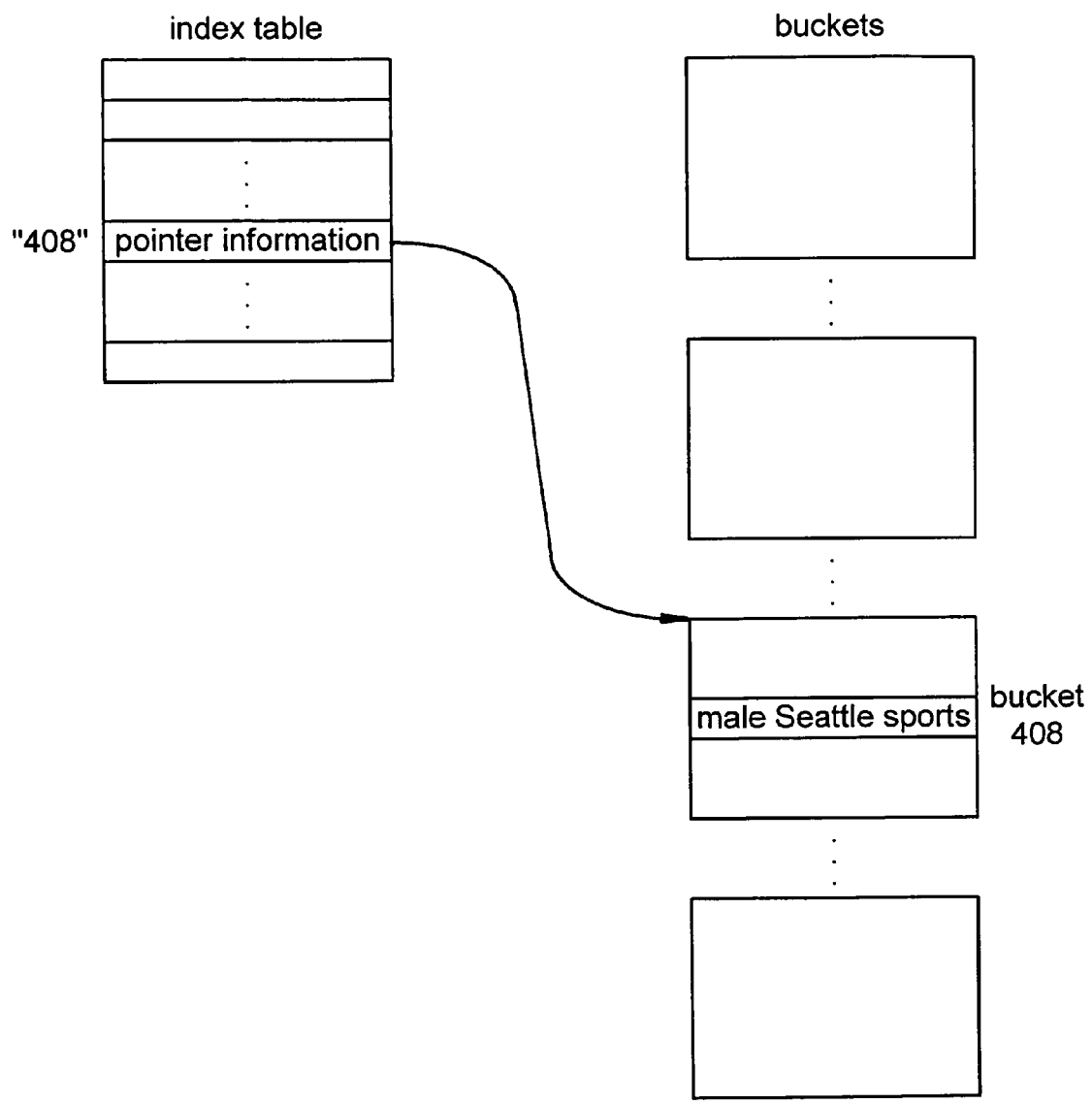
FIG. 4 is a simplified schematic diagram illustrating an exemplary embodiment of an advertising inventory database in accordance with the present invention.

FIG. 4 is a simplified schematic diagram illustrating an exemplary embodiment of the advertising inventory database 16 in accordance with the present invention. Referring to FIG. 4, demographic information from an adlog entry includes the following: [male, Seattle, sports]. Each of these represents a value of a demographic attribute. In this example, the three demographic attributes are gender, location and interest. Each value of the demographic attribute has a numerical counterpart. For example, the gender attribute can have three possible values, "male," "female" and "any" which correspond to "1," "2" and "3" respectively.

Using the numerical values of the demographic attributes, a hash function is then used to generate a bucket index. In this case, the bucket index is "408." The bucket index is then stored in the index table. The bucket indexed by the bucket index "408" is then retrieved and information from the adlog entry is then stored as an individual entry in bucket "408." Since the hash function may generate the same bucket index for various combinations of demographic attributes, each bucket is likely to have more than one entry and all entries in the same bucket therefore have the same bucket index.

Hence, in order to retrieve an entry from the advertising inventory database 16, the demographic information is used to generate the bucket index. The bucket index is then used to look up the location of the pointer information within the index table. Once the pointer information is located, the desired bucket can be found. When the desired bucket is found, the entries contained therein are examined to locate the desired entry having the correct demographic information.

Based on the disclosure and teachings provided herein, a person of ordinary skill in the art will know of ways, methods and techniques to implement an advertising inventory database in accordance with the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A computerized system for providing inventory information in response to a query having demographic criteria, comprising:
   an advertisement database for maintaining advertising inventory information;
   a contract database for maintaining contract information; and
   a server in communication with said advertisement database and said contract database, said server operable to:
      receive a query having demographic criteria from a user, determine, in response to said receiving of said query, a total query inventory from said advertisement database which satisfies said demographic criteria of said query;
   determine a total contract inventory which satisfies criteria of a contract;
   determine an intersection between said total query inventory and said total contract inventory;
   determine a contract delivery target pursuant to said contract;
   determine a total sold inventory based on said intersection and said contract delivery target;
   determine a total available inventory using said total query inventory and said total sold inventory, and
   provide said total available inventory to said user.

2. The system of claim 1 wherein said server is further operable to determine said contract delivery target pursuant to said contract
   by dividing a total quantity to be delivered pursuant to said contract by a period specified by said contract to determine said daily contract delivery target.

3. The system of claim 1 wherein said server is further operable to determine a daily total sold inventory
   by multiplying said daily contract delivery target with said intersection and then divide a product thereof by said daily total contract inventory to determine said daily total sold inventory.

4. The system of claim 1 wherein said server is further operable to determine a daily total available inventory using said daily total query inventory and said total sold inventory by
   subtracting said daily total sold inventory from said daily total query inventory to determine said daily total available inventory.

5. A computerized system for providing inventory information, comprising:
an inventory database;
a contract database: and
a server including:
logic configured to receive, from a user, a query having a date range and demographic criteria;
logic configured to retrieve information from said inventory database and use said retrieved information to determine a daily total query inventory for each day within said date range, said daily total query inventory information represents daily inventory information which satisfies said demographic criteria;
logic configured to retrieve one or more contracts from said contract database, each contract having a contract period, demographic criteria and total delivery target;
logic configured to examine one or more contracts, for each contract, said logic is further configured to perform:
using information retrieved from said inventory database to determine a daily total contract inventory for each day of said contract period which falls within said date range, said daily total contract inventory information represents daily inventory which satisfies said demographic criteria of said contract
determining a daily intersection between said daily total query inventory and said daily total contract inventory for each day of said contract period which falls within said data range;
using information retrieved from said inventory database to determining a daily contract delivery target for each day of said contract period which falls within said data range;
determining a daily total sold inventory using said daily intersection, said daily contract delivery target and said daily total contract inventory for each day of said contract period which falls within said data range;
determining a daily total available inventory using said daily total query inventory and said daily total query inventory for each day of said contract period which falls within said data range;
logic configured to tabulate all daily total available inventory from all examined contracts from all days within said date range; and
logic configured to provide said daily total available inventory to said user.

6. The computerized system of claim 5 wherein said logic configured to examine one or more contracts is configured to examine said one or more contracts in an unordered manner.

7. The computerized system of claim 5 wherein said determining a daily total contract inventory for each day of said contract period which falls within said date range further comprises:
dividing said total delivery target by said contract period.

8. The computerized system of claim 5 wherein said determining a daily total sold inventory using said daily intersection, said daily contract delivery target and said daily total contract inventory for each day of said contract period which falls within said data range further comprises:
multiplying said daily contract delivery target with said daily intersection and then dividing a product thereof by said daily total contract inventory.

9. The computerized system of claim 5 wherein said determining a daily total available inventory using said daily total query inventory and said daily total query inventory for each day of said contract period which falls within said data range further comprises:
subtracting said daily total sold inventory from said daily total query inventory.

10. The computerized system of claim 5 wherein said inventory database further comprises:
a plurality of buckets; and
an index table having a plurality of entries, each entry including index information which is used to locate a corresponding bucket;
wherein said plurality of buckets includes a plurality of records, each record including said demographic information and other inventory information.

11. The computerized system of claim 10 wherein a hash function is used to process said demographic information to organize said plurality of entries.

12. The computerized system of claim 10 wherein each of said plurality of buckets includes a plurality of records, each record including said demographic information and other inventory information.

* * * * *